F. H. WITTERN.
VEHICLE SIGNAL.
APPLICATION FILED JAN. 20, 1921.
1,411,764.
Patented Apr. 4, 1922.
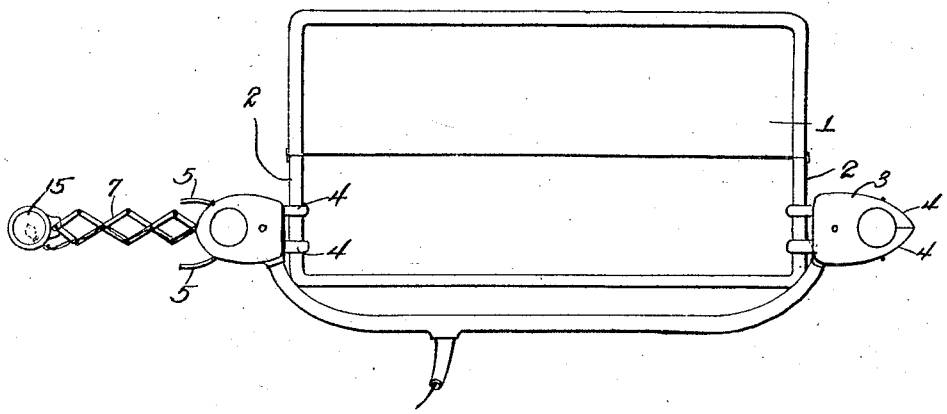
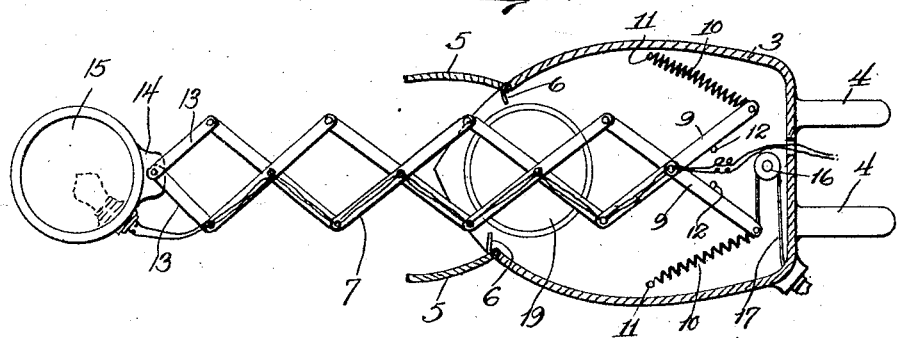
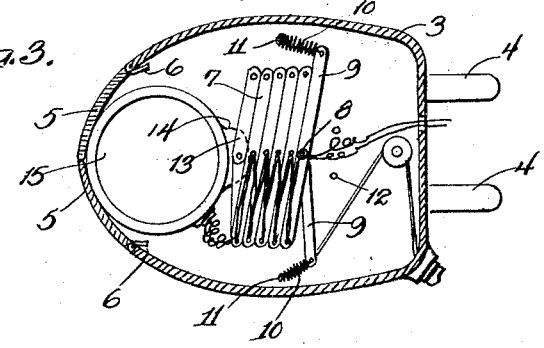
Inventor
Frank H. Wittern

UNITED STATES PATENT OFFICE.

FRANK H. WITTERN, OF FLANDREAU, SOUTH DAKOTA.

VEHICLE SIGNAL.

1,411,764.

Specification of Letters Patent.  Patented Apr. 4, 1922.

Application filed January 20, 1921. Serial No. 438,615.

*To all whom it may concern:*

Be it known that I, FRANK H. WITTERN, a citizen of the United States, residing at Flandreau, in the county of Moody and State of South Dakota, have invented certain new and useful Improvements in a Vehicle Signal, of which the following is a specification.

This invention relates to automobile signals and more particularly to an attachment for a vehicle adapted to be manually operated for displaying a signal whereby operators of approaching or following vehicles may observe the direction in which the vehicle is about to turn.

Another object of the invention is to provide an illuminated signal device adapted to be operated by toggle levers whereby the signal member may be moved to operative or inoperative position by manipulation of an operating device connected to the said toggle levers.

The invention further contemplates the provision of a device of this character which will act to be used as a parking light when the signal light is not in operative position.

Other objects of the invention will appear upon consideration of the following detail description and accompanying drawings, wherein:—

Figure 1 is a view of an automobile wind shield showing the invention applied thereto, Figure 2 is an enlarged view of the signal member in operative position, Figure 3 is a similar view showing the signal member in inoperative position.

Referring to the drawing by numerals, the wind shield 1 is of the usual type and each opposite side is provided with the usual frame bars 2. Attached to one of these frame bars is a casing 3 held in position by suitable bracket members 4. The casing is of any preferred shape and design and is preferably large enough to receive the mechanism included in the signal. The outer portion of the casing 3 is provided with hinged closure members or doors 5 each of which is provided with a trip member 6 at its hinged portion for a purpose which will presently appear.

A series of toggle levers 7 are adapted to be arranged within the casing 3 when the levers are in closed position as shown in Fig. 3 and the two innermost levers have their central portions pivotally connected together upon a stationary pivot pin 8 within the casing, the pivot pin extending transversely through the same. These two levers indicated at 9 are slightly longer than the other levers and their free terminals are connected to one end of a spring 10 the opposite end of which is fixed to the casing as shown at 11. Stop pins 12 are provided to limit the swinging movement of the toggle levers 9. The outermost levers are in the form of links 13 and their connected terminals are secured to a flange 14 mounted on the casing of a signal light 15, the latter being provided with a suitable glass panel and having an illuminating light mounted therein which is connected by suitable wiring extending to a battery or other source of current, so that the light may be illuminated.

Mounted within the casing 3 is a pulley or roller 16 over which a flexible cord 17 is extended, one end of the cord being secured to one of the levers 9 as shown in Figs. 2 and 3. This cord 17 extends through a tube 18 which may lead either to the hand wheel of the automobile or a foot lever according to the method employed for operating the device. It will be understood that the cord 17 may be operated either by a hand lever or a foot lever located within convenient reach of the operator of the vehicle. The signal members at opposite sides of the wind shield are entirely independent of each other so that either one of the signal members may be operated.

The opposite side walls of the casing 3 are provided with openings having glass panels 19 mounted therein whereby the electric light will be visible through the panels 15 and 19 when the signal member is in closed position.

In operation to extend the signal to the position shown in Figs. 1 and 2, it will be merely necessary to exert a pull on the flexible cord 17 whereupon the two levers 9 will be pivoted on their stationary pivot 8 thus causing the toggle levers 7 to be extended whereby the lamp casing will be thrust outwardly and cause the doors 5 to open. The toggle levers may consist of any number of levers so that the signal lights may be extended to any desired distance from the wind shield. This will indicate to approaching vehicles that the operator is about to turn in the direction indicated. When the flexible cord is released, the coil springs 10 will act to swing the levers 9 back to inoperative position thus causing the toggle levers to be collapsed whereupon the lamp casing will engage the trip members 6 and swing them inwardly to close the doors 5 thus completing the action of the device and causing the casing 3 to be entirely closed.

Minor changes may be made in the details of construction without departing from the spirit of the invention or the scope of the claim hereunto appended.

What is claimed is:—

An automobile signal comprising a stationary casing adapted to be mounted upon a wind shield, doors hingedly mounted on the casing, each door being provided with a trip member, a series of toggle levers adapted to be collapsed within the casing and move outwardly through the doors when the toggle levers are extended, the innermost levers being longer than the other levers and pivotally connected together upon a stationary pivot member within the casing, a flexible member passing over a course within reach of the operator and connected to the lower innermost toggle lever, means within the casing to guide the said flexible member, and a movable signal light connected to the outer ends of the said toggle levers and adapted to move outwardly through the open doors, the said trip members being in position to be engaged by the lamp casing whereby the doors will be closed when the lamp casing is moved inwardly, and spring means mounted in the casing and connected to the extended ends of the innermost levers to collapse the levers for moving the signal lights inwardly of the casing when the flexible member is released.

In testimony whereof, I have affixed my signature in the presence of two witnesses.

FRANK H. WITTERN.

Witnesses:
J. R. COONROD,
W. D. SPEAR.